United States Patent [19]

Snow et al.

[11] Patent Number: 4,918,117
[45] Date of Patent: Apr. 17, 1990

[54] POLYBUTADIYNE COATED CARBON FIBER REINFORCED POLYMER COMPOSITES

[75] Inventors: Arthur Snow, Alexandria, Va.; James P. Armistead, College Park, Md.

[73] Assignee: The United States of America as represented by the Secretary of the Navy, Washington, D.C.

[21] Appl. No.: 256,433

[22] Filed: Oct. 12, 1988

[51] Int. Cl.$^4$ .......................... C08K 9/00; B32B 9/00; D02G 3/00

[52] U.S. Cl. ............................... 523/215; 423/447.1; 423/447.2; 428/367; 428/375; 428/408; 523/207; 523/215

[58] Field of Search ................ 428/367, 375; 558/418; 525/275, 279; 524/258

[56] References Cited

U.S. PATENT DOCUMENTS

| | | | |
|---|---|---|---|
| 4,125,534 | 11/1978 | Yee | 260/315 |
| 4,208,501 | 6/1980 | Yee et al. | 526/259 |
| 4,321,299 | 3/1982 | Frazer | 428/247 |
| 4,454,178 | 6/1984 | Naarman | 428/220 |
| 4,581,315 | 4/1986 | Garito | 430/269 |
| 4,596,741 | 6/1986 | Endon et al. | 428/368 |

OTHER PUBLICATIONS

Armistead et al. "Butadiyne Vapor Deposition Polymerization on Carbon Fibers", 19th International SAMPE Technical Conference, Oct. 13–15, 1987, pp. 644–652.

*Primary Examiner*—Lorraine T. Kendell
*Assistant Examiner*—J. M. Gray
*Attorney, Agent, or Firm*—Thomas E. McDonnell; A. David Spevack

[57] ABSTRACT

Polymer composites reinforced with carbon fibers coated with polybutadiyne and the coated fibers are described. The polybutadiyne coating is formed in a closely adherent film on or slightly below the surface of carbon fibers by substantially simultaneously vapor depositing and polymerizing butadiyne on the fiber.

10 Claims, No Drawings

POLYBUTADIYNE COATED CARBON FIBER REINFORCED POLYMER COMPOSITES

BACKGROUND OF THE INVENTION

1. FIELD OF THE INVENTION:

This invention relates to coated carbon fiber reinforced polymer composites and to the coated carbon fiber. More particularly, this invention relates to organic polymer matrix composites reinforced with carbon fibers which are surface treated with vapor deposited polybutadiyne.

2. DESCRIPTION OF THE PRIOR ART:

The adhesive bond between a carbon fiber and matrix resin is critical to the performance of composite materials. As stated by D. W. McKee and V. J. Mimault, in the chapter, "Surface Properties of Carbon Fibers", *Chemistry and Physics of Carbon*, Eds. P. L. Walker, Jr. and P. A. Thrower, Marcel Dekker, Inc., New York, pp 190–220, (1973) and H. Ishida and J L. Koenig, Eds.,in *Composite Interfaces*, Elsevier Science Publishing Co., Inc., New York, (1986) improvement and understanding of the bonding of this interface region has been and continues to be an important research objective. Surface treatment of the carbon fiber has a pronounced effect on the quality of the adhesive bond. As shown in the McKee reference referred to above, the treatments involve a variety of chemical etching and coating deposition techniques. The effects by which these treatments promote adhesion are believed to involve a complicated mixed contribution from surface roughness, improved fiber wetting and enhanced chemical interaction.

Endou, et al., in U.S. Pat. No. 4,596,741, describes the use of SiC coatings to provide coatings for carbon fibers in carbon fiber reinforced plastic and metal composites. Yee, et al. in U.S. Pat. Nos. 4,208,501 and 4,125,534 suggests that diacetylenic polymers can be formed by vapor depositing particular monomers and subsequently converting them to a polymer. For totally different purposes, Garito, in U.S. Pat. No. 4,581,315 describes forming polymer films by vapor deposition from diacetylinic monomers. Froch, et al., in U.S. Pat. No. 4,321,299, describes a fiber reinforced structure wherein a polymer is formed from vapor deposited monomers.

It is still necessary to provide a carbon fiber coating compatible with both the particular form of carbon fiber and the polymer matrix.

SUMMARY OF THE INVENTION

Accordingly, an object of this invention is a polymer coating for carbon fibers compatible with the fiber and a polymer composite matrix.

Another object of this invention is a polymer composite reinforced with a compatible polymer coated carbon fiber A further object of this invention is a method of efficiently vapor depositing and polymerizing a closely adherent compatible polymer coating on a single carbon fiber or a large grouping of fibers.

These and additional objects of the invention are accomplished by a polymer composite reinforced with carbon fibers coated with polybutadiyne. The polybutadiyne is formed in a closely adherent film on and slightly below the surface of carbon fibers by substantially simultaneously vapor depositing and polymerizing the butadiyne monomer to polybutadiyne.

DETAILED DESCRIPTION OF THE INVENTION

The novel carbon fiber surface treatment of this invention is based on the vapor deposition and substantially simultaneous polymerization of butadiyne. This technique is an interfacial polymerization which is similar to a monomer gas polymerization.

Butadiyne is a moderately reactive liquified gas which condenses and subsequently polymerizes on surfaces to form a coating which conforms and closely adheres well to the substrate. Reaction temperatures for polymerization are mild ranging from 25° to 100° C. This polymer has been structurally characterized by A. W. Snow, in "Polymerization of Butadiyne: Polymer Characterization and Properties", *New Monomers and Polymers*, Eds. B. M. Culbertson and C. U. Pittman, Plenum Press, New York, pp. 399–414, (1984) as an aromatic polymer highly functionalized with pendant terminal acetylenic groups.

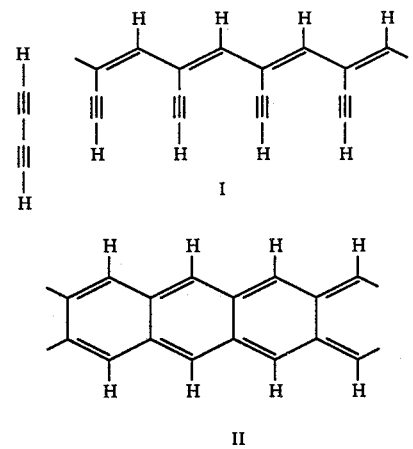

For structural representation purposes, the polymer is best described as a combination of ethynyl substituted polyene (I) and polyacene (II) structures.

As reported by A. W. Snow, in *J. Macromol. Sci., A27*, p.1429, (1985) the butadiyne monomer can penetrate crystalline regions of certain substrates before it polymerizes and that the polymer formed has exceptional thermal stability. This system is well-suited for expediently coating individual carbon fiber surfaces in tows or in larger groupings. To be most effective in promoting adhesion between fiber and matrix, the coating should be between about 20 and about 2000 Å thick. Preferably the coating, is between 20 and 200 Å thick and most preferably 20Åthick.

The polybutadiyne deposition onto carbon fiber is characterized by infrared and XPS spectroscopies and SEM. The adhesion to a bisphenol A epoxy/m-phenylenediamine resin is characterized by a single-fiber/resin tensile test measurement of the critical fiber length and observed birefringence. These tests are described by L. T. Drzal, M. J. Rich and P. F. Lloyd, *J. Adhesion*, 16(1982); L. T. Drzal, M. J. Rich, M. F. Koenig and P. F. Lloyd, *J. Adhesion*, 16, p.133 (1983); L. T. Drzal, M. J. Rich and M. F. Koenig, *J. Adhesion,* 18, p.49 (1985) (W. D. Bascom and R. M. Jensen, *J. Adhesion*, 19, p.219 (1986).

The coated carbon fibers of this invention are well suited for use as reinforcements in organic polymer matrix composites. Any of the polymer matrix materials well known in the art such as phenol-formaldehydes, bis-maleimides, polyimides etc. can be used in this invention. The preferred polymer is bisphenol A epoxy/m-phenylene diamine Having described the invention, the following examples are given to illustrate specific applications of the invention. These specific examples are not intended to limit the scope of the invention described in this application.

EXAMPLE

Polybutadiyne Deposition and Characterization

Butadiyne Monomer Synthesis

Butadiyne is prepared by the dehydrochlorination of 1,4-dichloro-2-butyne in aqueous potassium hydroxide dioxane solution as described by A. W. Snow, *J. Macromol. Sci., A27*, p.1429 (1985). The monomer polymerizes too rapidly for storage in the liquid phase at room temperature but may be stored conveniently as a vapor in a large bulb at room temperature with only a very slow deposition of polymer on the vessel wall.

Polybutadiyne Deposition

The butadiyne vapor deposition polymerizations onto short lengths of carbon fiber tows are conducted in a tubular reactor (20 cm length ×4.5 cm diameter) fitted with an "O"ring joint and Teflon vacuum valve at one end. The lower 16 cm length is heated electrically with a tubular furnace. The carbon fiber substrates are 15 cm lengths of Hercules AS-4 fiber tows which are removed from the inner wrappings of the spool and transferred without hand contact to a clean 1.8 ×15 cm tube. This holding tube is placed in the reactor which is then heated to the deposition temperature under vacuum for 1 to 3 hrs. The deposition temperature can range from 25° C. to 300° C. A temperature of 100° C. is preferred because it is convenient and provides an easily controlled deposition rate.

The butadiyne vapor is charged into the reactor to a pressure of 700 torr for the prescribed reaction time which is typically between about 1 and 3 hours. For moderate to heavy deposition (>0.2% by weight), the quantity of butadiyne could be determined gravimetrically.

Formation of Composites

The polymer composite is formed by immersing polybutadiyne treated tows (or larger groupings of fibers) in a bath of bisphenol A epoxy/m-phenylene diamine to impregnate the fiber with the polymer matrix. Excess polymer is blotted as the tow emerges from the bath. The impregnated tows are immediately formed into panels (or any other desired shape). The polymer is cured under pressure at an elevated temperature by placing the panel in a Carver press at 2,000 psi at 110° C. as is known for these polymers.

X-ray Photoelectron Spectroscopy

XPS spectra were obtained from the polybutadiyne deposited on AS-4fibers. The elemental composition data are presented in Table 1.

TABLE 1

| XPS ELEMENTAL COMPOSITION OF POLYBUTADIYNE SAMPLES | | | |
|---|---|---|---|
| Sample | % C | % O | % N |
| AS-4 fiber | 81.47 | 14.05 | 4.47 |
| uncoated control | 82.98 | 15.25 | 1.75 |
| AS-4 fiber | 98.16 | 1.83 | 0.00 |
| 3% deposition | 98.06 | 1.94 | 0.00 |

For the AS-4 fiber in comparison with the uncoated control, the carbon composition increases from 82 98% while the oxygen content decreases from 14 or 15% to 2% and the nitrogen content decreases to an undetectable level. The variation between duplicate analyses on the control As-4 fiber may indicate some heterogeneity in its composition. These results are consistent with deposition of a polymer film with good substrate surface coverage and a composition similar or identical to that of the monomer.

Scanning Electron Microscopy

SEM was used to observe the butadiyne coating on the carbon fibers. For depositions of 1.1 weight percent or less the fibers appeared very much like the control fibers having smooth and featureless surfaces. The fibers with a 9.4 weight percent coating also had smooth surfaces, but in this case, cracks were visible in the coating and there were regions where large, thin pieces of the butadiyne coating had broken away from the fiber Single Fiber/Epoxy Tensile Test The single fiber/resin tensile test has been investigated as a method of assessing interfacial adhesion of carbon fibers to resin matrices (L. T. Drzal, M. J. Rich and P. F. Lloyd, J. Adhesion 16, 1 (1982); L. T. Drzal, M. J. Rich, M. F. Koenig and P. F. Lloyd, J. Adhesion 16, 133 (1983); L. T. Drzal, M. J. Rich and M. F. Koenig, J. Adhesion 18, 49 (1985) (W. D. Bascom and R. M. Jensen, J. Adhesion 19, 219 (1986)). In a tensile test a particular single fiber is axially encased in a resin dogbone sample and fragmented by straining the sample. The fiber fracture process is accompanied by the development of birefringent stress patterns around the fragments which can be interpreted as evidence of good or bad adhesion. With increased straining, a constant distribution of fiber fragment lengths are obtained which can be measured The basic equation for this test is:

$$l_c = \frac{\sigma_c d}{2\tau_c}$$

where $l_c$ is the critical fragment length, $\sigma_c$ is the critical fiber tensile strength (at the $l_c$ gauge length), d is the fiber diameter and $\tau_c$ is a stress transfer parameter which has been related to an interfacial shear strength (L. T. Drzal, M. J. Rich and P. F. Lloyd, J. Adhesion 16, 1 (1982); L. T. Drzal, M. J. Rich, M. F. Koenig and P. F. Lloyd, J. Adhesion 16, 133 (1983); L. T. Drzal, M. J. Rich and M. F. Koenig, J. Adhesion 18, 49 (1985) or the shear yield strength of the resin (W. D. Bascom and R M. Jensen, J. Adhesion 19, 219 (1986)). When the fiber and resin are the same over a series of measurements on samples with varying degrees of surface treatment, smaller $l_c$ values imply larger $\tau_c$ values and greater adhesion assuming $\sigma_c$ has not been altered by the surface treatment.

Measurements of $l_c$ were made on a series of AS-4 fibers with polybutadiyne deposition levels of 0.2, 1.1 and 9.4 weight percent (Table 2).

TABLE 2

CRITICAL FIBER LENGTH MEASUREMENTS
OF POLYBUTADIYNE COATED AS-4 FIBERS IN
SINGLE FIBER/EPOXY RESIN TENSILE TEST

| Deposition (% w/w) | lc (mm) | Birefringence Observation |
|---|---|---|
| 0 (control) | 0.40 | good adhesion |
| 0.2 | 0.30 ± .04 | good adhesion |
| 1.1 | 0.29 ± .03 | good adhesion |
| 9.4 | 0.29 ± .08 | poor adhesion |

For these respective samples significantly shorter critical fiber lengths were obtained when compared with an uncoated control test. However, samples with higher levels of deposition exhibited irregular birefringent stress patterns and a broader distribution of critical fiber lengths.

Poor adhesion correlates with the birefringent stress pattern of the samples with the thicker polybutadiyne coatings and may be related to the SEM observation of an onion skin-like feature on the fiber surface. Paradoxically, the critical fiber length does not reflect the "poor adhesion" of the birefringence observation with increasing polybutadiyne coating thickness. It may be possible that heavy depositions generate flaws that weaken the fiber thus decrease $l_c$ by decreasing $\sigma_c$. A simple calculation of coating thickness (assuming equal coating and fiber densities and a 6 micron fiber diameter) results in values of 30, 164 and 1380 A thickness for the respective 0.2, 1.1 and 9.4% depositions. A 30 A thick coating is adequate for adhesion promoting purposes without the brittle character of the butadiyne polymer weakening the fiber. The birefringent stress patter of the 0.2% deposition sample in the single-fiber test was indicative of "good adhesion".

Obviously, many modifications and variations of the present invention are possible in light of the above teachings. It is therefore to be understood that within the scope of the appended claims, the invention may be practiced otherwise than as specifically described.

What we claim is:

1. A carbon fiber having a closely adherent coating of thermally polymerized polybutadiyne homopolymer.

2. The fiber according to claim 1 wherein the average thickness of the coating is between 20 and 2,000 A.

3. The fiber according to claim 1 wherein the coating is between 0.2 and 9.4 weight percent.

4. The fiber according to claim 2 wherein the coating is between 20 and 200 A thick.

5. The fiber according to claim 3 wherein the coating is 0.2 weight percent.

6. The fiber according to claim 4 wherein the coating is 20 A thick.

7. A composite comprising multiple fibers as described in claim 1 incorporated in a polymer matrix.

8. The composite according to claim 7 wherein the matrix is a bisphenol A epoxy/m-phenylene diamine.

9. The composite according to claim 8 wherein the average thickness of the coating is between 20° and 200° thick.

10. The composite according to claim 9 wherein the coating on the fiber is about 20 A thick.

* * * * *